(12) United States Patent
Knutson et al.

(10) Patent No.: US 6,370,160 B1
(45) Date of Patent: Apr. 9, 2002

(54) BASE TO HANDSET EPOCH SYNCHRONIZATION IN MULTI-LINE WIRELESS TELEPHONE

(75) Inventors: Paul Gothard Knutson; Kumar Ramaswamy, both of Indianapolis; Dong-Chang Shiue, Carmel, all of IN (US)

(73) Assignee: Thomson Licensing S. A., Boulgne Cedex (FR)

( * ) Notice: Subject to any disclaimer, the term of this patent is extended or adjusted under 35 U.S.C. 154(b) by 0 days.

(21) Appl. No.: 09/222,465

(22) Filed: Dec. 29, 1998

(51) Int. Cl.⁷ .......................... H04J 3/06; H04B 7/212; H04L 7/00
(52) U.S. Cl. ..................... 370/503; 370/442; 375/354
(58) Field of Search ................................ 370/336, 442, 370/503, 508–510, 512, 516, 519; 375/137, 134, 142, 145, 149, 150, 354, 355, 356, 326–327, 362, 364; 455/502, 403

(56) References Cited

U.S. PATENT DOCUMENTS

| | | | |
|---|---|---|---|
| 3,781,803 A | * 12/1973 | Shear et al. | 375/356 |
| 5,917,868 A | * 6/1999 | Kuusinen | 375/354 |
| 5,943,369 A | * 8/1999 | Knutson et al. | 375/326 |
| 6,154,642 A | * 11/2000 | Dumont et al. | 455/403 |

* cited by examiner

Primary Examiner—Wellington Chin
Assistant Examiner—Steven Nguyen
(74) Attorney, Agent, or Firm—J. S. Tripoli; H. D. Fried; J. J. Kolodka (57) ABSTRACT

A wireless telephone system and related method are described, the system having a plurality of wireless handsets and a base unit, the base unit having a base transceiver, each handset having a handset transceiver for establishing a wireless link over a shared channel with the base unit via the base transceiver. The base unit transmits a signal comprising a current packet of a plurality of packets of an epoch. Each handset transceiver has a receiver having a parallel correlator for generating timing error signals and end-of-packet signals for the signal, and a timing loop for receiving the timing error signals and for establishing symbol-level timing synchronization. An enable resynch gate of the receiver receives the end-of-packet signals from the parallel correlator to establish packet-level synchronization, and a de-packetizer of the receiver reads epoch location information from the current packet which identifies the location of the current packet within the epoch. A counter of the receiver receives the epoch location from the de-packetizer and establishes epoch-level synchronization.

12 Claims, 5 Drawing Sheets

BASE TO HANDSET EPOCH SYNCHRONIZATION IN MULTI-LINE WIRELESS TELEPHONE

FIELD OF THE INVENTION

The present invention relates to digital signal processing systems and methods, in particular, to a system and method for providing base to handset epoch-level synchronization for multi-line wireless telephone systems employing TDMA (time division multiple access) schemes.

BACKGROUND OF THE INVENTION

Digital data transmission from a transmitter to a receiver requires a variety of digital signal processing techniques to allow the data to be transmitted by the transmitter and successfully recovered by the receiver. In digital wireless telephone systems, a cordless or wireless telephone handset unit communicates via digital radio signals with a base unit, which is typically connected via a standard telephone line to an external telephone network. In this manner, a user may employ the wireless handset to engage in a telephone call with another user through the base unit and the telephone network.

Multi-line wireless telephone systems are in use in various situations, such as businesses with many telephone users. Such systems employ a handset that communicates with up to N handsets simultaneously, typically with digital communications schemes, such as a spread-spectrum, time division multiple access (TDMA). In a spread spectrum system, bandwidth resources are traded for performance gains, in accordance with the so-called Shannon theory. The advantages of a spread-spectrum system include low power spectral density, improved narrowband interference rejection, built-in selective addressing capability (with code selection), and inherent channel multiple access capability. Spread-spectrum systems employ a variety of techniques, including direct sequencing (DS), frequency hopping (FH), chirp systems, and hybrid DS/FH systems.

In a TDMA system, a single RF channel is used, and each handset transmits and receives audio data packets as well as non-audio data packets during dedicated time slices or slots within an overall TDMA cycle or epoch. Other communications schemes include frequency division multiple access (FDMA), code division multiplexing/multiple access (CDM/CDMA), and combinations of such schemes, both full and half duplex. Various modulation schemes are often employed, such as carrierless amplitude/phase (CAP) and quadrature amplitude modulation (QAM).

Such digital data is often transmitted as modulated signals over a transmission medium, such as the RF channel, in the form of binary bits of data. (Other transmission media often used for digital communications include twisted-pair systems employing asymmetric digital subscriber loop (ADSL) technology or cable modem systems.) The digital data is often modulated and transmitted in complex digital data form, in which the transmitted data comprises symbols from which the original data can be reconstructed by the receiver. Complex digital symbol data typically comprises real (in-phase, or "I") data, and imaginary (quadrature, or "Q") data (I, Q pairs). Each symbol of an I,Q pair may be a multi-bit number, and represent a location of a constellation, mapped against a decision region such as a quadrant. Each symbol is mapped or assigned to a prescribed coordinate in a four-quadrant grid-like constellation using a look-up table (e.g., a ROM). A prescribed number of symbols occupy assigned areas in each quadrant, depending on the encoding scheme. Depending on the number of bits/symbol of a given encoding scheme, each quadrant of the constellation contains a number of symbols at prescribed coordinates with respect to quadrature I and Q axes. For example, in the QPSK encoding scheme, each sample has one of four phase positions, one for each quadrant, so that each symbol pair represents two bits of data.

To transmit a given input data value in a complex data system, the input data value to be transmitted is mapped to a symbol pair or pair of coordinates I,Q of a corresponding constellation point on a complex signal constellation having real and imaginary axes I and Q. These I,Q symbols, which represent the original data value, are then transmitted as part of data packets by a modulated channel. A receiver can recover the I,Q pairs and determine the constellation location therefrom, and perform a reverse-mapping to provide the original input data value or a close approximation thereof.

In a spread spectrum system, each symbol is transmitted by a string of "sub-symbols" or "chips", derived by multiplying the symbol times a pseudo-random number (PN) binary string. Such systems are thus characterized by a chip rate, which is related to the symbol rate by a so-called spread factor (a factor by which the original symbol data rate has been expanded). Spread spectrum systems may also be used, in general, to transmit any digital data, whether in complex format or not.

As noted above, digital data transmission requires a variety of digital signal processing techniques to allow the data to be transmitted by the transmitter and successfully recovered by the receiver. For example, a communications link must first be established, in which the two transceivers lock onto each other, establish synchronization and other system parameters, and the like. The receiver side of a data transmission in a spread-spectrum digital wireless telephone systems employs a variety of functions to recover data from a transmitted RF signal. These functions can include: timing recovery for symbol synchronization, carrier recovery (frequency demodulation), equalization, and gain control. The receiver includes symbol timing recovery (STR), automatic gain control (AGC), carrier tracking loops (CTL), and equalizer loops for each link.

Timing recovery is the process by which the receiver clock (timebase) is synchronized to the transmitter clock. This permits the received signal to be sampled at the optimum point in time to reduce the chance of a slicing error associated with decision-directed processing of received symbol values. In some receivers, the received signal is sampled at a multitude of the transmitter symbol rate. For example, some receivers sample the received signal at twice the transmitter symbol rate. In any event, the sampling clock of the receiver must be synchronized to the symbol clock of the transmitter.

Carrier recovery is the process by which a received RF signal, after being frequency shifted to a lower intermediate passband, is frequency shifted to baseband to permit recovery of the modulating baseband information. Equalization is a process which compensates for the effects of transmission channel disturbances upon the received signal. More specifically, equalization removes intersymbol interference (ISI) caused by transmission channel disturbances. ISI causes the value of a given symbol to be distorted by the values of preceding and following symbols. These and related functions, and related modulation schemes and systems, are discussed in greater detail in Edward A. Lee & David G. Messerschmitt, *Digital Communication,* 2d ed. (Boston: Kluwer Academic Publishers, 1994).

In a multi-line wireless telephone system employing an epoch scheme such as TDMA, there is a need for each handset to be properly synchronized to the epoch, so that it knows when to turn on and off to transmit and receive data during the appropriate time slots of the epoch allocated to the particular handset. In one technique, an "epoch beacon" is transmitted by the base unit at a predetermined portion of each epoch (typically, at the beginning of the epoch), to allow each handset to receive the beacon and determine packet and related epoch timing for each epoch. However, the beacon approach can be complex, costly, and can inefficiently utilize bandwidth and handset battery power. Some approaches avoid synchronization and operate asynchronously, utilizing oversampling and related techniques to avoid having to completely synchronize. However, such approaches can also inefficiently utilize bandwidth or be otherwise undesirable.

SUMMARY

A wireless telephone system having a plurality of wireless handsets and a base unit, the base unit having a base transceiver, each handset having a handset transceiver for establishing a wireless link over a shared channel with the base unit via the base transceiver. The base unit transmits a signal comprising a current packet of a plurality of packets of an epoch. Each handset transceiver has a receiver having a parallel correlator for generating timing error signals and end-of-packet signals for the signal, and a timing loop for receiving the timing error signals and for establishing symbol-level timing synchronization. An enable resynch gate of the receiver receives the end-of-packet signals from the parallel correlator to establish packet-level synchronization, and a de-packetizer of the receiver reads epoch location information from the current packet which identifies the location of the current packet within the epoch. A counter of the receiver receives the epoch location from the de-packetizer and establishes epoch-level synchronization

DESCRIPTION OF THE PREFERRED EMBODIMENT

The present invention, in one embodiment, provides for a TDMA epoch timebase which provides hierarchical TDMA epoch synchronization in a multi-line wireless telephone system employing a TDMA epoch scheme. The base unit encodes TDMA epoch information in each packet, which is then used by each handset transceiver to achieve TDMA epoch synchronization, as described in further detail below.

Figure 1:
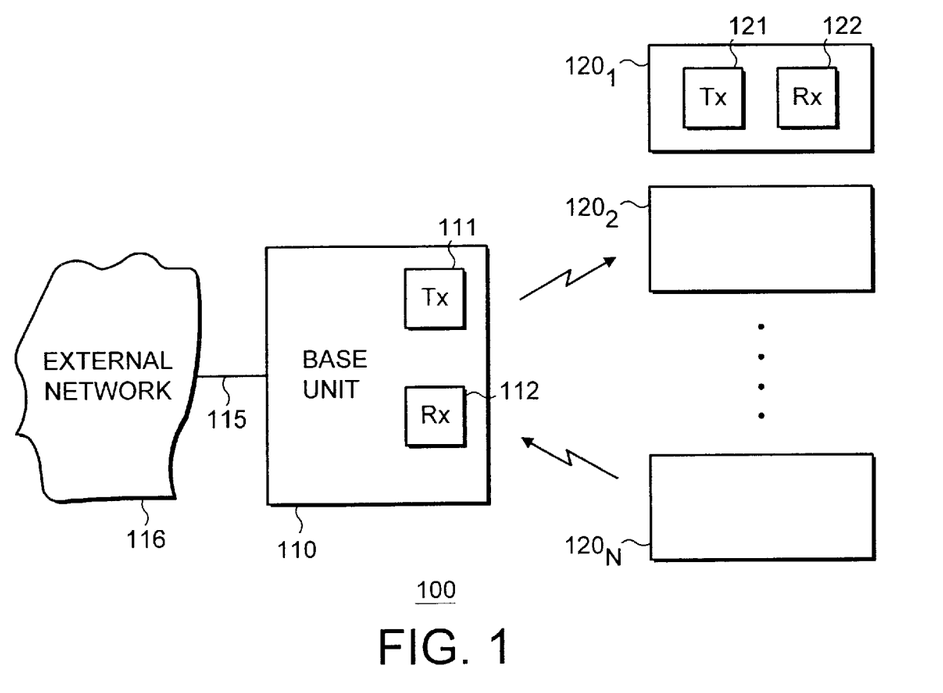
FIG. 1 is a block diagram of a spread spectrum TDMA multi-line wireless telephone system, in accordance with an embodiment of the present invention.

Referring now to FIG. 1, there is shown a block diagram of TDMA multi-line wireless telephone system 100, in accordance with an embodiment of the present invention. TDMA system 100 comprises a base unit 110, which has receiver and transmitter units 112 and 111, respectively, and is coupled to external telephone network 116 via telephone line(s) 115. System 100 also comprises N wireless handsets $120_1$, $120_2$, . . . $120_N$. Each has a transmitter and receiver unit (transceiver), such as transmitter 121 and receiver 122 of handset $120_1$. At any given time, some number (or none) of the handsets are operating or off hook (i.e., in the process of conducting a telephone call). System 100 thus provides a wireless network or link between the base station 110 and each handset $120_i$ (1<=i<=N). In one embodiment, system 100 comprises 4 handsets $120_1$–$120_4$, all of which may be active simultaneously. In another embodiment, system 100 comprises a different number of handsets, e.g. N=12, of which up to 8 can be active or operational at a time.

Each transmitter 121 modulates and transmits modulated signals. A variety of digital modulation formats may be employed in such systems, including: QAM, CAP, PSK (phase shift keying), PAM (pulse amplitude modulation), VSB (vestigial sideband modulation), FSK (frequency shift keying), OFDM (orthogonal frequency division multiplexing), and DMT (discrete multitone modulation).

In one embodiment, the present invention comprises a TDMA system for connecting multiple transceivers to a base station over a single RF channel. In particular, system 100 employs a digital TDMA scheme, as described in further detail below, which allows power to be efficiently used since each operating handset is "off" (i.e., not transmitting or receiving data, and thus not using as much battery power) during most portions of the TDMA epoch, and is only "on" during its own time slices or slots. In one embodiment, a handset powers off by switching off power to at least its CPU and transceiver (receiver and transmitter) units, while leaving powered on only a clock and associated timer or watchdog circuitry sufficient to wake up the CPU at a predetermined slot time.

In the present invention, the transmitter 121 of each handset $120_i$ implements a digital variable symbol rate modulation. The transmitter 111 of base unit 110 may also implement such a modulation scheme. Receiver portion 122 of each handset transceiver preferably implement a digital demodulation scheme, such as the timing recovery system described in European Patent Application No. EP 0 793 363, European filing date Feb. 20, 1997, Applicant Thomson Consumer Electronics, Inc., inventors Knutson, Ramaswamy, and McNeely. As described in further detail below, each handset employs the TDMA epoch synchronization of the present invention.

Figure 2:
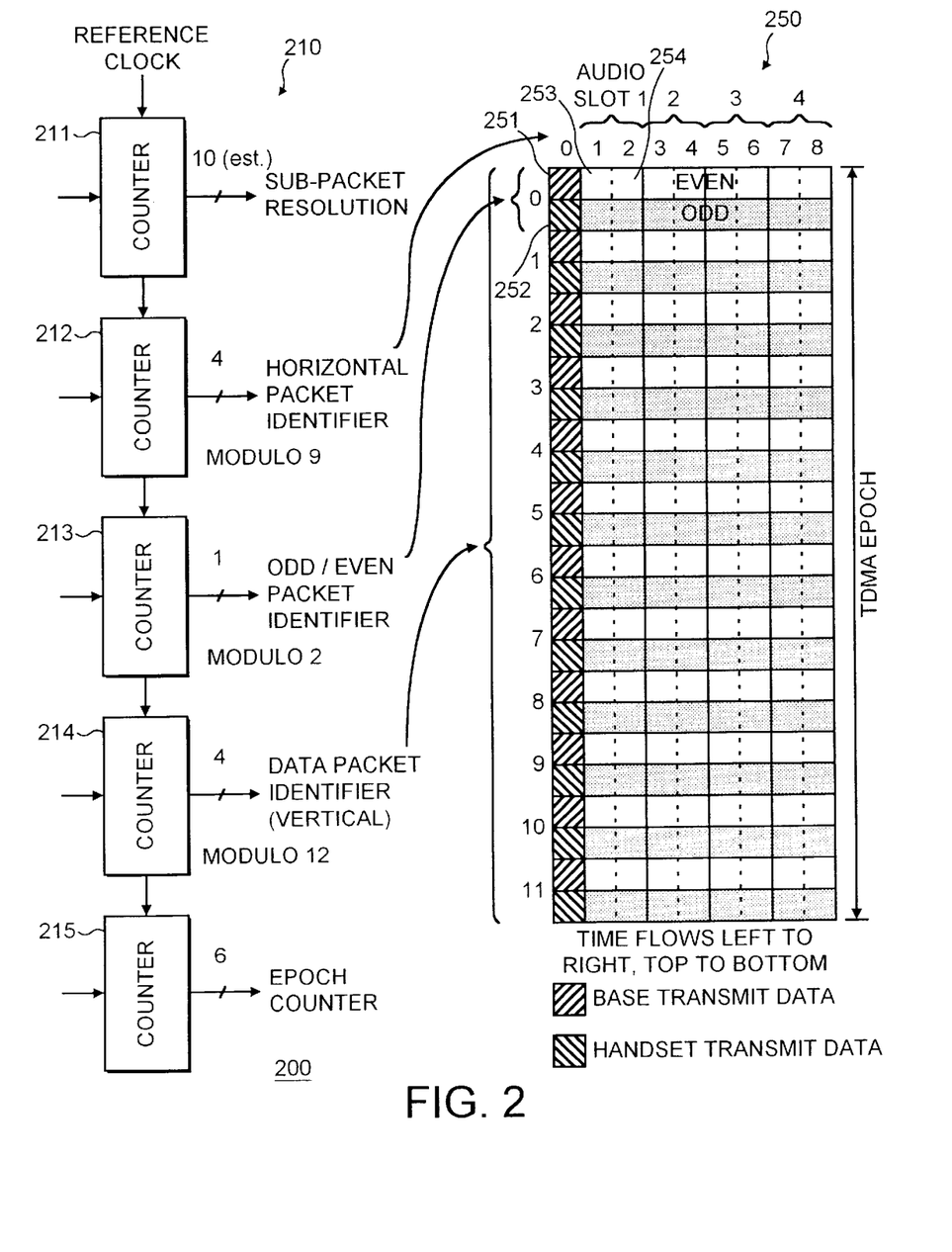
FIG. 2 is a schematic representation of the TDMA slot structure and handset counters used in the TDMA scheme of the system of FIG. 1, in accordance with an embodiment of the present invention.

Referring now to FIG. 2, there is shown a schematic representation of the TDMA slot or epoch structure 250 and handset counters 210 used in the TDMA scheme 200 of the system of FIG. 1, in accordance with an embodiment of the present invention. System 100 employs a TDMA epoch having structure 250, which is illustrated assuming 12 total handsets $120_1$–$120_{12}$, of which 8 can be active or operational at a time, e.g. handsets $120_1$–$120_8$. TDMA epoch structure 250 comprises a number of rows and columns. Each row of TDMA structure 250 represents a 2 ms field of digital data, and is either even or odd and grouped in a pair with an odd or even, respectively, row or field. TDMA epoch structure 250 is a 48 ms epoch.

Each field of digital data comprises nine total packets: a data packet in the first column (either transmitted from the base or from a handset) and eight audio packet, grouped in 4 pairs of two. Each such pair of audio packets in a row includes one packet (time slot) of base audio transmission (to a given handset from base unit 110) and one packet of handset audio transmission (from the given handset to the base). Each data packet is a set of data transmitted either to a given handset from the base unit or vice-versa, during a discrete time slot during which time no other handsets receive or transmit data over the system's data channel. These data packets may contain various types of data, such as synchronization data or words with time stamp information transmitted to a handset in sleep mode, caller ID information, incoming call information, and the like. Data packets transmitted from a handset to the base may contain information such as the telephone number being dialed by the handset. Each audio packet is a set of audio data transmitted either to a given handset from the base unit or vice-versa, during a given time slot in the overall epoch, again during which time no other handsets receive or transmit data over the system's single RF channel. In an embodiment of the present invention, epoch location information (e.g., horizontal packet, odd/even, and vertical field counts) are included in each packet, both data and audio, which information is then used, as described in further detail below, by each handset receiver to synchronize onto a common TDMA timebase.

Thus, for example, row pair 0 comprises an even row and odd row. In the even row, the base transmits data in the first time slot (slot 251), to one of the 12 handsets, e.g. handset 120₁. There is one row pair in epoch 250 for each handset, so that each handset can receive and transmit data to base unit 110 once per epoch. After the first data slot 251, assuming handset 120₁ is operational (off hook), an audio packet is transmitted to handset 120₁ in audio packet slot 253, then an audio packet is transmitted by handset 120₁ to base unit 110 in audio packet slot 254, and so on for 3 of the other handsets until the end of the field or row. In the odd row for row pair 0, data slot 252 is used to receive data transmitted from handset 120₁ to base unit 110, and audio packets are transmitted for the remaining 8 active handsets. In row pairs 111, the same sequence occurs, except the data packets are to and from different handsets than for row pair 0.

In the present invention, a time base capable of resolving a fraction of a time slot over the period of several seconds is established in each handset which matches the TDMA slot timing in base unit 110. The TDMA epoch structure 250 is known by both each handset and the base, and once the time bases are synchronized, the handset receiver will know when it should listen for transmissions from the base, and it will know when it should send data back to the base. Keeping the TDMA slots known to within microseconds over a one second interval requires that a very stable and accurate reference be provided to operate this time base.

To eliminate collisions in the protocol, all handsets are given a designated data time slot, and audio time slots are allocated dynamically, according to which handset needs them. This information is communicated over the data channel (the first column of TDMA structure 250). The TDMA slots are divided into data and audio slots in a two-dimensional arrangement, as illustrated in FIG. 2. The base transmits synchronization packets to handsets in their respective data slots until a call is initiated.

Each handset maintains a cascade of counters 210, to keep local timing of each handset from drifting and thus in synchronization with the TDMA epoch. This is done be applying a reference clock signal to first counter 211 (all counters are initialized at some previous point, which initialization may proceed in stages). The reference clock signal is provided by a local clock in the handset, which is periodically adjusted as necessary, to correct for drifting, in accordance with time stamp synchronization information transmitted by base unit 110 during data packet slots. Counter 211 keeps track of sub-packet resolution, and identifies which bit of the packet is being processed, out of, for example, 100 bits per audio packet. Counter 212 keeps track of the horizontal packet, or time slot (i.e., the column number of the current row or field of TDMA epoch structure 250). Counter 213 keeps track of whether the current row is odd or even, and counter 214 keeps track of whether or not the current packet is a data packet or not, and which handset the data packet correlates with, and whether the data packet is to or from the base unit 110, i.e., the vertical field of epoch 250 to which the packet belongs. Finally, counter 215 keeps track of which epoch the system 100 is in. This may be useful in requesting retransmission of corrupted data sent by base unit 110 during a certain epoch, for example.

The TDMA system of the present invention saves power by turning off most components of the handset, other than an internal clock and watchdog circuitry, for most of the TDMA epoch. The internal clock and protocol implemented by each handset ensures that synchronization is not lost, however, even though the handset is powered down. Thus, power is saved, but synchronization is not lost. Each handset may be in one of two states: in sleep mode, or operational mode.

In sleep mode, when the handset is on hook, only an internal clock and watchdog timer runs for most of the time, where the clock has previously been synchronized to the base unit clock and epoch. Thus, in sleep mode, the handset is configured so that it will wake up and "listen" for data during its assigned "receive data" slot, and turn off again thereafter if there is no incoming call. The wake up is caused by the watchdog timer counting down to a certain value, which switches on the CPU and other components necessary to listen for and/or transmit data. During this data slot, the handset receives synchronization data from base unit 110 and adjusts its internal clock, if necessary, to correct for any drifting. In the very next data slot, the handset may wake up again to acknowledge that it is alive and synchronized by transmitting a suitable "I'm alive" data message to base unit 110. Thus, in one embodiment, when in sleep mode, each handset is on for only two data packets of the entire TDMA epoch, a duty cycle of approximately 0.93% (2 slots/(9× 12×2 slots)). Powering up to allow the handset to listen to a data packet transmission from base unit 110 once every 48 ms epoch is sufficient to allow a handset to stay synchronized (i.e., to keep the communication loops in lock), and also to allow any incoming calls to be detected quickly enough to alert the user of incoming calls (e.g., to allow caller ID information to be viewed and/or calls to be answered in real time).

In an alternative embodiment, the handset skips a number of epochs entirely, and, for example, wakes up during its data slots only once during every 3rd epoch, as this will also be sufficient for synchronization and real time incoming call monitoring. This reduces the duty cycle further. The "I'm alive" message from the handset (e.g., transmitted in data slot 252) need not be transmitted every epoch, or even every epoch when the handset wakes up and listens to data from base unit 110. Preferably, these parameters are user programmable. For example, a handset may be programmed to wake up every 3rd epoch and listen during its data slot, and to transmit back an "I'm alive" message every 6th epoch. In this case, the base unit, which does not have similar power constraints, will nevertheless transmit synchronization data every epoch but will know that the handset is adequately synchronized as long as an "I'm alive" data message is received every 6 epochs. Otherwise, base unit 110 can assume that lock has been lost and can then try to restore the link, e.g. by transmitting data/sync packets to the lost handset at three increasing power levels, during its respective data packet slot. Lock may be lost, for example, when the handset battery is changed, or when the handset stays out of range for a duration longer than handset TDMA timing can tolerate. This effectively increases the dynamic range of the system. For example, with 30 dB of power control and 70 dB of AGC, the system can acquire lock over a 100 dB dynamic range.

If a handset detects an incoming call during the data slot of one of the epochs in which it listens, it can ring and enter operational mode to allow audio communication. Additionally, if a user turns on the handset to place a call, the handset also enters operational mode and transmits appropriate data to the base unit.

In operational mode, when a handset is off hook and being used, it is deactivated during most of the TDMA epoch, as in sleep mode, except that it turns on once for each epoch during the two data slots for the handset, and also turns on for two audio packets (an audio packet pair) for every field in which it is allocated an audio slot pair. For example, if handset $120_1$ is operational, it will be on for data slots 251, 252 for each epoch, and also for the first two audio slots of the even row of each row pair (24 audio slots total). Thus, in one embodiment, when in operational mode, each handset is on for only two data packets and 24 audio packets of the entire TDMA epoch, a duty cycle of approximately 12% (26 slots/(9×12×2 slots)) (assuming 8 handsets are operational, so that a given handset has 2 audio slots every other field, instead of every field).

In both sleep and operational modes, therefore, the TDMA scheme and power saving protocol described above provides for power to be efficiently used since each operating handset is off and thus not consuming much power, for most of the time (whether in sleep mode or off hook).

Figure 3:
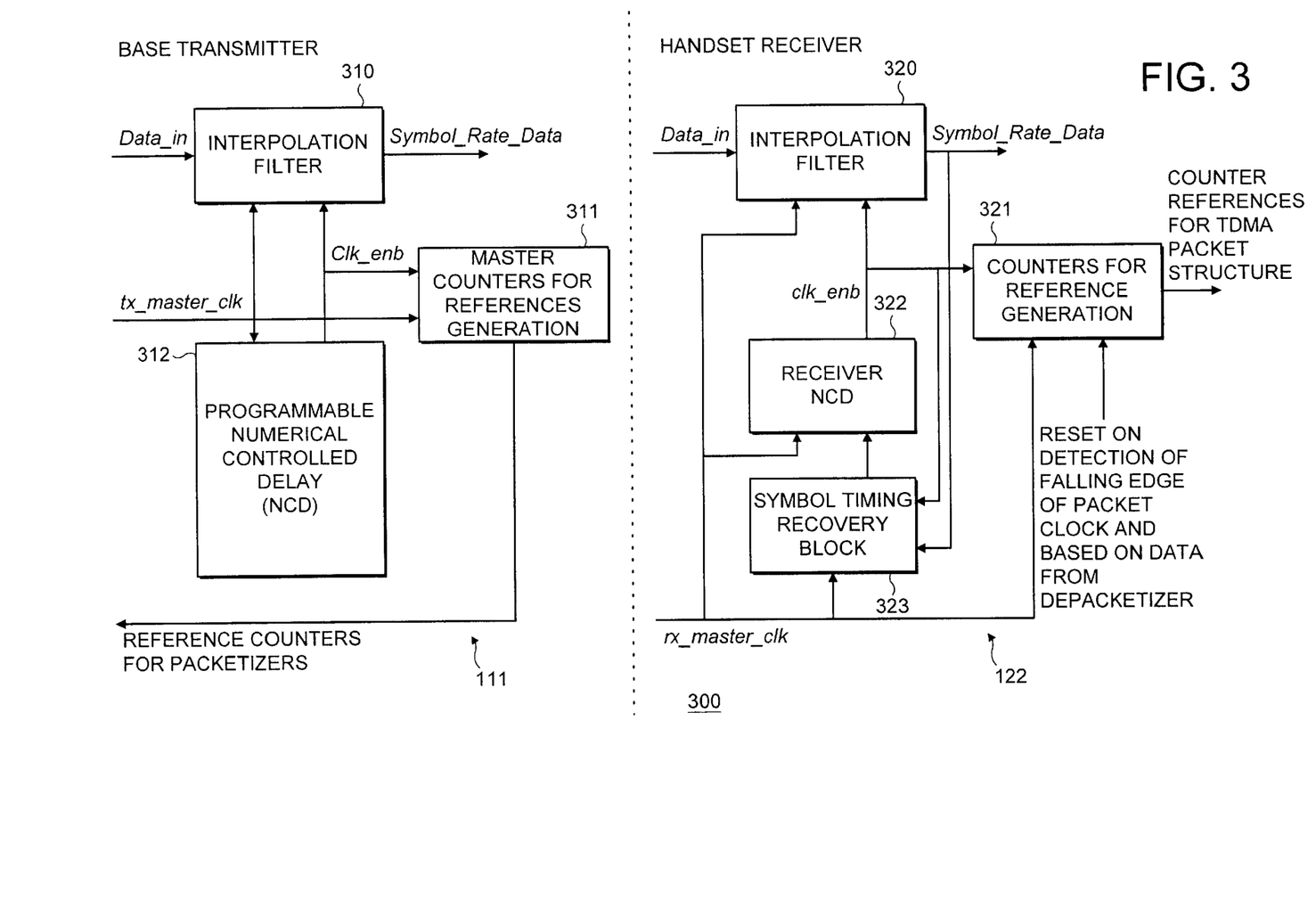
FIG. 3 is a block diagram illustrating the base transmitter and a handset receiver of the system of FIG. 1 in further detail, in accordance with an embodiment of the present invention.

Referring now to FIG. 3, there is shown a block diagram 300 illustrating the base transmitter 111 and a handset receiver, e.g. receiver 122, of system 100 of FIG. 1 in further detail, in accordance with an embodiment of the present invention. Base transmitter 111 comprises interpolation filter (interpolator) 310, master counters 311, and a programmable numerically controlled delay (NCD) 312. Handset receiver 122 comprises interpolation filter (interpolator) 320, counters 321, NCD 322, and symbol timing recovery unit or loop 323. As illustrated, in one usage of system 100, data is provided to interpolator 310 of base transmitter 111, from a direct sequence spreader. This data is interpolated by interpolator 310 to a desired symbol rate. Master counters 311 establish the time base for the TDMA epoch, by generating reference counters for horizontal packet, odd/even, and vertical counts, which are fed to the reference counters for the packetizers used to group data into audio or data packets. Thus, each packet contains information on its location within the TDMA epoch, as described in further detail below with reference to FIGS. 4 and 5. In one embodiment, this epoch location information comprises the counts from horizontal packet, odd/even, and field counters. A given handset, e.g. receiver 122 of handset $120_1$, uses this information to synchronize the handset in the TDMA scheme, as described in further detail below with reference to FIG. 5.

Figure 4:
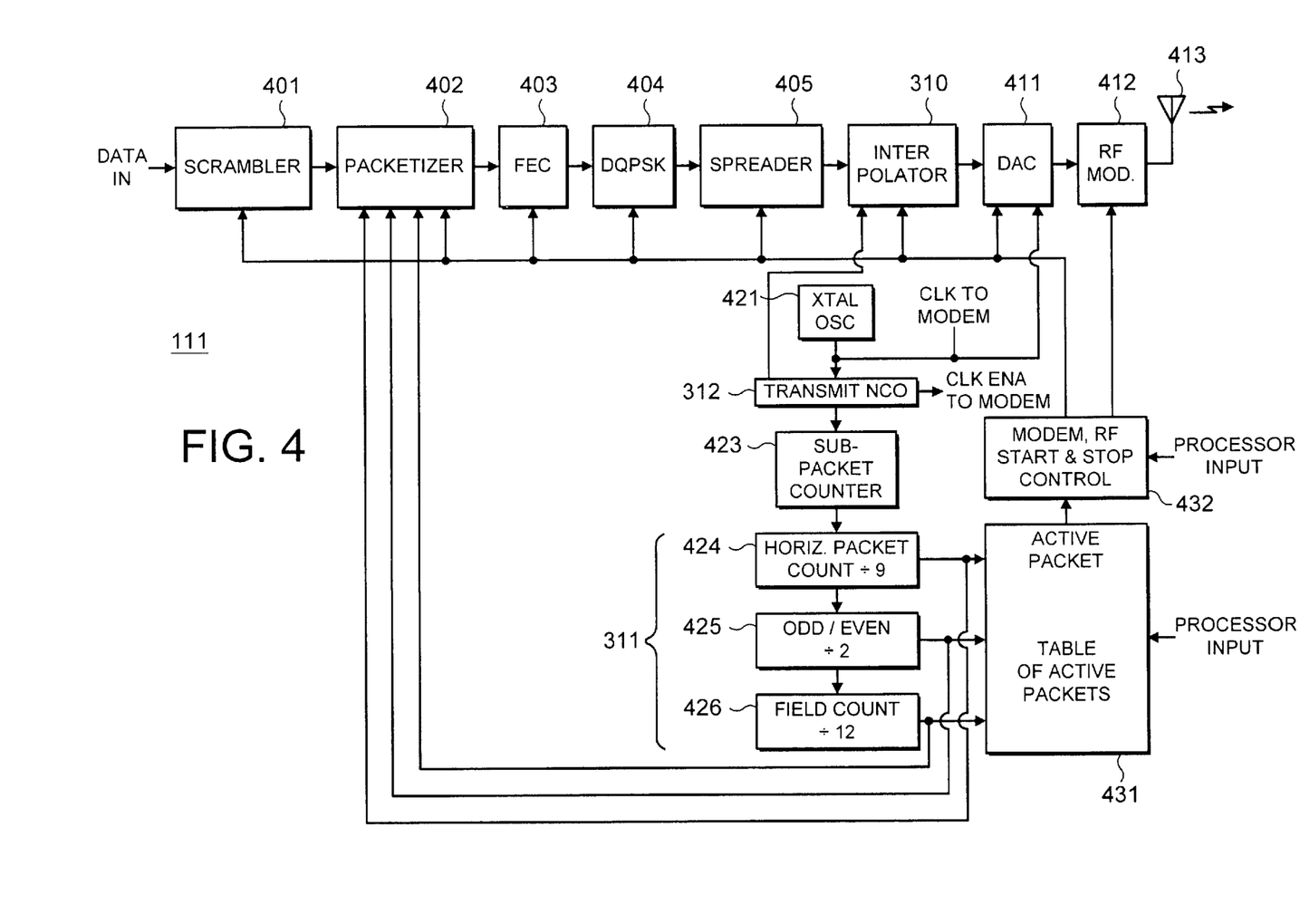
FIG. 4 is a block diagram illustrating the base to handset TDMA synchronization signal processing flow of the base transmitter of FIG. 3 in further detail.

Referring now to FIG. 4, there is shown a block diagram illustrating the base to handset TDMA synchronization signal processing flow of the base transmitter 111 of FIG. 3 in further detail. Base transmitter 111 receives data in, at scrambler 401, which scrambles (encrypts) the data. The scrambled data is then packetized by packetizer 402. Using of the information provided by counters 311 (horizontal packet counter 424, odd/even (field) packet counter 425, field counter 426), packetizer 402 "stuffs" each packet with this TDMA epoch location information, preferably in a dedicated field or fields of the packet, e.g. a 4-bit field sufficient to uniquely identify the TDMA epoch location of the packet. Following packetization, transmitter 111 performs forward error correction (FEC) with FEC unit 403, and differential quadrature phase shift keying (DQPSK) modulation with DQPSK unit 404. Direct sequence spreader 405 and interpolator 310 are also to the packets for transmission, as will be appreciated by those skilled in the art. Digital-to-analog converter (DAC) 411 converts the digital signals to analog, and RF modulator 412 and antenna 413 are used to transmit the signals to the handsets.

Base unit 110 and transmitter 111 also comprise a crystal oscillator 421, transmit NCD 312, and sub-packet counter 423, modem & RF start & stop control unit 432, and table of active packets unit 431. Sub-packet counter 423 counts time on a fractional packet basis and is used for fine timing. NCD 312 is programmed to a constant frequency, and the TDMA divider counters 311 run free from clock oscillator 421.

During encoding of each subsequent packet of the TDMA epoch to be transmitted by base unit 110, counters 311 are used to provide the necessary epoch location information to packetizer 402, i.e. the horizontal packet, odd/even, and vertical field counts of counters 424, 425, 426 (this information, or time stamp, may also be referred to as the temporal location of the packet). Thus, each packet received by a handset such as receiver 122 contains the horizontal packet, odd/even, and vertical field information for the packet.

Figure 5:
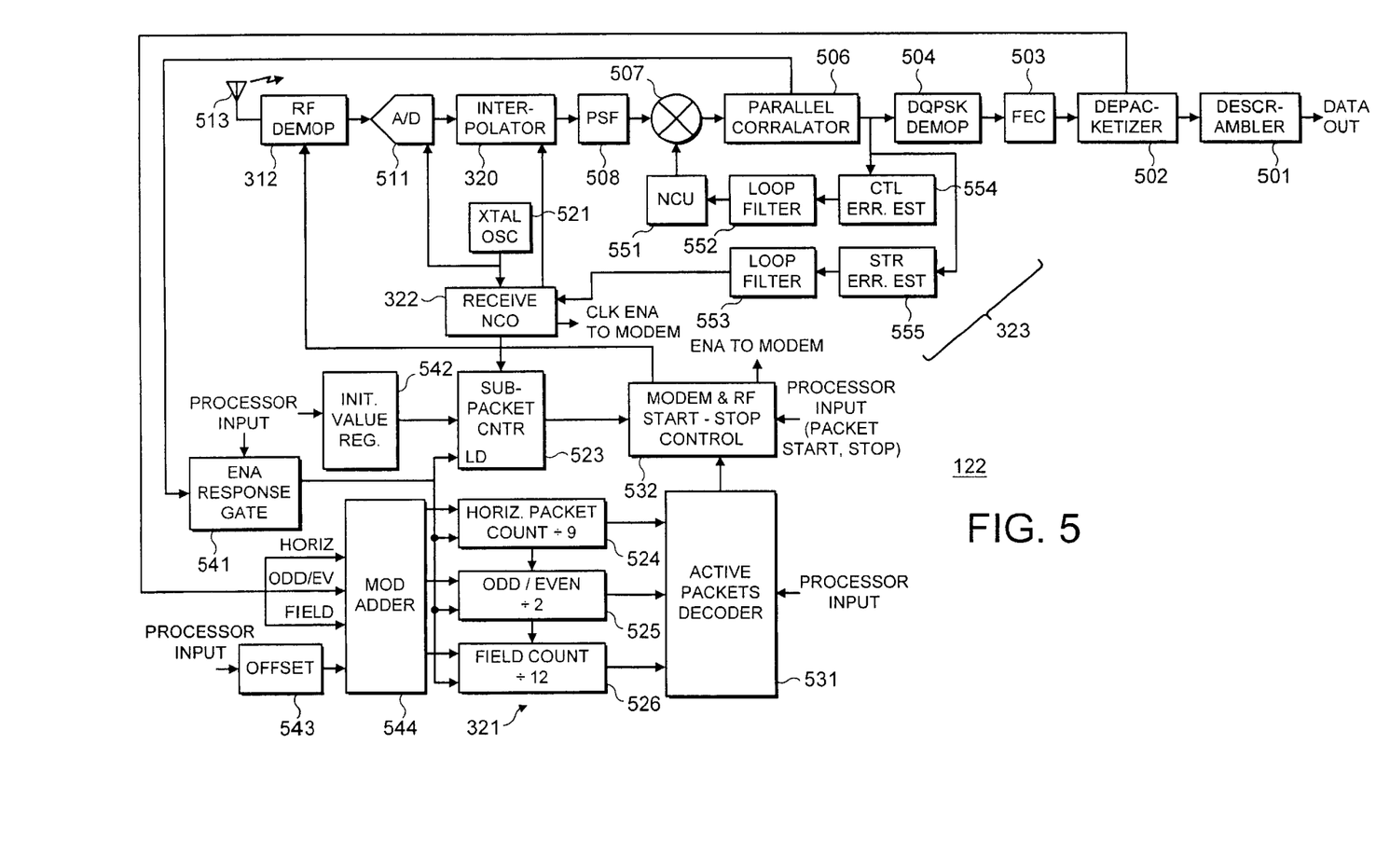
FIG. 5 is a block diagram illustrating the base to handset TDMA synchronization signal processing flow of the handset transmitter of FIG. 3 in further detail.

Referring now to FIG. 5, there is shown a block diagram illustrating the base to handset TDMA synchronization signal processing flow of the handset transmitter 122 of FIG. 3 in further detail. Handset receiver 122 comprises antenna 513, RF demodulator 512, analog-to-digital converter (ADC) 511, interpolator 320, pulse shaping filter (PSF) 508, derotator 507, parallel correlator 506, DQPSK demodulator 504, forward error correction unit 503, de-packetizer 502, and descrambler 501, which provides the data. The CTL comprises receive NCO 551, loop filter 552, and CTL error estimator 554. STR loop 323 comprises symbol timing error unit 555 and loop filter 553.

As will be appreciated, the synchronization of a given handset such as handset $120_1$ is accomplished through the timing recovery and parallel correlation subsystems. On a cold start, parallel correlator 506 drives STR loop 323 to lock onto symbol timing. Parallel correlator 506 performs the correlation process, which provides both timing and carrier error to STR loop 323 and to the CTL, respectively. Loop filter 553 of STR loop 323 provides correlation timing lock signals to receive NCD 322 as part of the timing locking. Once timing is locked and there is thus timing-level synchronization (i.e., symbol-level timing synchronization), parallel correlator 506 detects the end of a packet, or packet boundary (not necessarily one that belongs to the receiving handset), and thus enables synchronization at the packet level. This is done by feeding back an end-of-packet signal to enable resynch gate unit 541, which causes counters 523, 524, 525, 526 to reload at the end of each packet. (As will be appreciated, counters 523, 524, 525, and 526 correspond to counters 211, 212, 213, and 214, respectively, of TDMA scheme 200 of FIG. 2.) In particular, this feedback with the end-of-packet signal is used to synchronize sub-packet counter 523, thereby achieving packet-level synchronization.

Once packet level synchronization is achieved, depacketizer 502 examines the contents of the packet and determines from the appropriate field of the packet where the current packet actually belongs in the TDMA epoch. This epoch location information is fed back to modulo adder 544, which accomplishes epoch-level synchronization for the current handset to tune to its particular packet. In particular, this epoch location information is loaded into the handset counter chain 321, and the time of the last symbol of the packet (the end-of-packet signal fed back from parallel correlator 506) is used to synchronize sub-packet counter 523, as previously described.

In one embodiment, a processor or other source can add offset 543, if necessary, to the received epoch or temporal location to compensate for decoding and demodulation delay, as will be appreciated. This can help to maintain a consistent time delay (offset) from transmitting a packet, receiving the packet, packet decoding, and comparing of the packet's time stamp to the counter 323 status, so that any difference measured reflects the difference in frequency of the base and handset reference oscillators.

Thus, in the present invention, each packet transmitted by base unit 110 includes self-identifying epoch location information, and each handset receiver hierarchically performs epoch synchronization, by first synchronizing on the timing level via parallel correlator and timing recovery subsystems. The end of packet detected by parallel correlator 506 after timing synchronization is achieved, is then used to enable synchronization at the packet level, by feeding the end-of-packet signal to enable resynch gate unit 541, which causes counters 523, 524, 525, 526 to reload at the end of each packet. This end-of-packet signal also is used by de-packetizer 502 to arrange the data into packets and to decipher the epoch location information. The epoch location information is fed back to modulo adder 544, which accomplishes synchronization for the current handset to tune to its particular packet.

The hierarchical synchronization of the present invention enables a handset receiver to quickly synchronize. In addition, once a handset is synchronized, the synchronization is maintained even when the handset goes to sleep between valid packet transmissions/receptions. This is due to the way in which packet and epoch level timing of the present invention is tied to the symbol timing in a very tightly coupled manner. Thus, packet and epoch level synchronization are maintained, based on the timing synchronization information.

In addition to digital communications of a wireless telephone system as described hereinabove, the present invention is also applicable to BPSK, QPSK, CAP and QAM, for example, as well as to VSB modulation systems such as employed by the Grand Alliance High Definition Television (HDTV) system proposed for use in the United States. One skilled in the art will recognize what design changes are required to adapt the disclosed transmitter modulation system to the desired modulation scheme, and will understand how to design the illustrated components to operate with the desired modulation scheme.

One skilled in the art will recognize that the wireless system described above according to the principles of the invention may be a cellular system where base unit 110 represents a base station serving one of the cells in a cellular telephone network.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A receiver of a transceiver for communicating with a second transceiver that transmits to the transceiver a signal comprising a current packet of a plurality of packets of an epoch, the receiver comprising:

(a) a parallel correlator for generating timing error signals and end-of-packet signals for the signal;

(b) a timing loop for receiving the timing error signals and for establishing symbol-level timing synchronization;

(c) means for receiving the end-of-packet signals from the parallel correlator to establish packet-level synchronization;

(d) a de-packetizer for reading epoch location information from the current packet which identifies the location of the current packet within the epoch; and (e) counter means for receiving the epoch location from the de-packetizer and for establishing epoch-level synchronization.

2. The receiver of claim 1, wherein:

the transceiver is a handset transceiver of a first wireless handset;

the second transceiver is a base transceiver of a base unit; and the first wireless handset and the base unit are part of a wireless telephone system further comprising a plurality of other wireless handsets, each handset comprising a handset transceiver for establishing a wireless link over a shared channel with the base unit via the base transceiver.

3. The receiver of claim 2, wherein the wireless link is a time-division multiple access (TDMA) link, in which each handset communicates during an exclusive time slot of a TDMA scheme that allocates time slots to handsets, and the epoch is a TDMA epoch.

4. The receiver of claim 2, wherein the wireless telephone system is a spread spectrum system in which each successive symbol is a chip of a binary spread spectrum chip sequence representing a complex symbol.

5. The receiver of claim 1, wherein means (c) comprises an enable resynch gate coupled at an input to an end-of-packet signal output of the parallel correlator and at an output to the counter means.

6. The receiver of claim 5, wherein the enable resynch gate, in response to the end-of-packet signal, causes the counter means to reload at the end of each packet.

7. The receiver of claim 1, wherein the epoch location information comprises a horizontal packet count, an odd/even field count, and a vertical field count.

8. The receiver of claim 7, wherein the counter means comprises a horizontal packet counter, an odd/even field counter, and a vertical field counter, and a modulo adder coupled at an input to the de-packetizer for receiving the horizontal packet count, the odd/even field count, and the vertical field count and at an output to inputs of the horizontal packet counter, the odd/even field counter, and the vertical field counter for providing the horizontal packet count, the odd/even field count, and the vertical field count.

9. The receiver of claim 8, wherein the modulo adder receives an offset which is added to the epoch location information to compensate for decoding and demodulation delay.

10. The receiver of claim 1, wherein the timing loop comprises a carrier tracking loop (CTL) error estimator coupled at an input to the parallel correlator, a loop filter coupled at an input to an output of the CTL error estimator, and a numerically controlled oscillator coupled at an input to an output of the loop filter.

11. In a receiver of a transceiver for communicating with a second transceiver that transmits to the transceiver a signal comprising a current packet of a plurality of packets of an epoch, a method for establishing epoch-level synchronization, the method comprising the steps of:

(a) generating, with a parallel correlator, timing error signals and end-of-packet signals for the signal;

(b) receiving the timing error signals and establishing symbol-level timing synchronization, with a timing loop;

(c) receiving the end-of-packet signals from the parallel correlator to establish packet-level synchronization;

(d) reading, with a de-packetizer, epoch location information from the current packet which identifies the location of the current packet within the epoch; and (e) receiving, with a counter means, the epoch location from the de-packetizer and establishing, with the counter means, epoch-level synchronization.

12. A wireless telephone system, comprising:

(a) a base unit having a base transceiver comprising a base transmitter for transmitting a signal comprising a current packet of a plurality of packets of an epoch, wherein each packet comprises epoch location information which identifies the location of the current packet within the epoch; and (b) a plurality of wireless handsets, each handset comprising a handset transceiver for establishing a wireless link with the base unit, the handset transceiver comprising a receiver comprising:

(1) a parallel correlator for generating timing error signals and end-of-packet signals for the signal;

(2) a timing loop for receiving the timing error signals and for establishing symbol-level timing synchronization;

(3) means for receiving the end-of-packet signals from the parallel correlator to establish packet-level synchronization;

(4) a de-packetizer for reading epoch location information from the current packet which identifies the location of the current packet within the epoch; and (5) counter means for receiving the epoch location from the de-packetizer and for establishing epoch-level synchronization.

\* \* \* \* \*